US011381705B1

(12) United States Patent
Li (10) Patent No.: US 11,381,705 B1
(45) Date of Patent: Jul. 5, 2022

(54) METHOD AND APPARATUS TO ADD ANNOTATIONS TO AN IMAGE

(71) Applicant: Xerox Corporation, Norwalk, CT (US)

(72) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/371,045

(22) Filed: Jul. 8, 2021

(51) Int. Cl.
*H04N 1/387* (2006.01)
*H04N 1/60* (2006.01)
*H04N 1/62* (2006.01)
*H04N 1/40* (2006.01)

(52) U.S. Cl.
CPC ....... *H04N 1/3871* (2013.01); *H04N 1/40093* (2013.01); *H04N 1/6072* (2013.01); *H04N 1/62* (2013.01); *H04N 2201/0094* (2013.01)

(58) Field of Classification Search
CPC ..... H04N 1/38–4097; H04N 1/46–648; G06K 15/1889; G06T 11/60
See application file for complete search history.

(56) References Cited

U.S. PATENT DOCUMENTS

| | | | |
|---|---|---|---|
| 6,327,049 B1 * | 12/2001 | Ohtsuka | G03D 15/005 358/1.18 |
| 7,957,033 B2 * | 6/2011 | Mori | H04N 1/32144 358/1.14 |
| 8,331,612 B2 * | 12/2012 | Li | G06T 11/60 715/230 |
| 8,335,344 B2 | 12/2012 | Li. et al. | |
| 2008/0294973 A1 * | 11/2008 | Suleiman | H04N 1/60 715/202 |
| 2020/0311999 A1 * | 10/2020 | Tachikawa | G06F 40/106 |

* cited by examiner

*Primary Examiner* — Scott A Rogers (57) ABSTRACT

A method is disclosed. For example, the method is executed by a processor of a multi-function device (MFD) and includes receiving a desired transparency level for an annotation image to be added to a canvas image, applying a transparency factor based on the desired transparency level to a transparency output function and an opaque output function to calculate an output value for each pixel of the canvas image that overlaps a pixel of the annotation image in a color space associated with the MFD, and generating an annotated canvas image that includes the output value that is calculated for each pixel of the canvas image that overlaps the pixel of the annotation image.

20 Claims, 7 Drawing Sheets

METHOD AND APPARATUS TO ADD ANNOTATIONS TO AN IMAGE

The present disclosure relates generally to printing documents on multi-function devices, and relates more particularly to a method and apparatus to add annotations to an image on a multi-function device.

BACKGROUND

Annotations are an important feature in printers, facsimile machines, and multi-function devices. Annotations may include graphics, images, text, or a combination thereof, that are separate from a canvas or printed image. In some instances, a user may want to add annotations to a canvas or previously scanned image.

Currently, printing devices provide two modes of annotation: full opaque and full transparent. In the opaque mode, a white box with annotating text replaces the area to be annotated. In transparent mode, the annotating text is superimposed on the original image. In addition, the current annotation modes are used for binary image data.

SUMMARY

According to aspects illustrated herein, there are provided a method, a non-transitory computer readable medium, and apparatus for annotating an image. One disclosed feature of the embodiments is a method that comprises receiving a desired transparency level for an annotation image to be added to a canvas image, applying a transparency factor based on the desired transparency level to a transparency output function and an opaque output function to calculate an output value for each pixel of the canvas image that overlaps a pixel of the annotation image in a color space associated with the MFD, and generating an annotated canvas image that includes the output value that is calculated for each pixel of the canvas image that overlaps the pixel of the annotation image.

Another disclosed feature is an MFD for annotating an image. The MFD includes a processor and a non-transitory computer readable medium storing instructions that are executed by the processor to perform operations comprising receiving a desired transparency level for an annotation image to be added to a canvas image, applying a transparency factor based on the desired transparency level to a transparency output function and an opaque output function to calculate an output value for each pixel of the canvas image that overlaps a pixel of the annotation image in a color space associated with the MFD, and generating an annotated canvas image that includes the output value that is calculated for each pixel of the canvas image that overlaps the pixel of the annotation image.

Another disclosed feature of the embodiments is a non-transitory computer-readable medium having stored thereon a plurality of instructions, the plurality of instructions including instructions which, when executed by a processor, cause the processor to perform operations comprising receiving a desired transparency level for an annotation image to be added to a canvas image, applying a transparency factor based on the desired transparency level to a transparency output function and an opaque output function to calculate an output value for each pixel of the canvas image that overlaps a pixel of the annotation image in a color space associated with the MFD, and generating an annotated canvas image that includes the output value that is calculated for each pixel of the canvas image that overlaps the pixel of the annotation image.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to add annotations to an image on a multi-function device. As discussed above, annotations are an important feature in printers, facsimile machines, and multi-function devices. Annotations may include graphics, images, text, or a combination thereof, that are separate from a canvas or printed image. In some instances, a user may want to add annotations to a canvas or previously scanned image.

Currently, printing devices provide two modes of annotation: full opaque and full transparent. In the opaque mode, a white box with annotating text replaces the area to be annotated. In transparent mode, the annotating text is superimposed on the original image. In addition, the current annotation modes are used for binary image data.

The present disclosure provides the ability for a user to select an amount of transparency for the annotation when the annotation is added to an image. The methods and functions used to implement the adjustable transparency may be applied to a color space associated with the multi-function device (MFD). For example, the functions may be used to adjust the transparency of the annotation in a cyan, yellow, magenta, and key (CMYK) color space, rather than binary image data associated with current methodologies.

Furthermore, the functions described herein to provide adjustable transparency for an annotation on an image may allow for the desired amount of transparency to be applied to only portions of the image or annotation. For example, some portions of the annotation may be opaque and other portions may be transparent. In some examples, the border of the annotation may be blended to provide a gradual transition from transparent to opaque to make the addition of the annotation more subtle.

Figure 1:
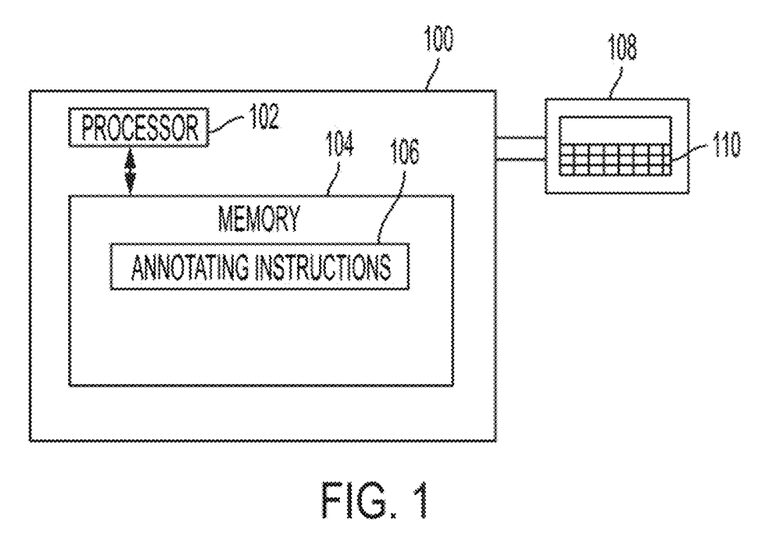
FIG. 1 illustrates a block diagram of an example multi-function device (MFD) of the present disclosure.

FIG. 1 illustrates an example of a multi-function device (MFD) 100 of the present disclosure. In one embodiment, the MFD 100 may be a device that can print, fax, copy, email, and the like. The MFD 100 has been simplified for ease of explanation and may include additional components that are not shown. For example, the MFD 100 may include paper trays to hold paper. The MFD 100 may include a digital front end (DFE) to convert print job requests into printer description language (PDL) to execute the print job requests. The MFD 100 may include a platen glass and an optical scanner to scan documents for copy and scanning functions. The MFD 100 may include a communication interface (e.g., wired or wireless) to communicate over an Internet protocol (IP) network (e.g., the Internet) to email documents, and so forth. The MFD 100 may include interfaces to connect to external storage devices (e.g., a universal serial bus (USB) interface) to access externally stored files, images, and/or documents.

In one embodiment, the MFD 100 may include a display 108 and a user interface 110. The display 108 may be a touch screen interface and the user interface 110 may include touch buttons displayed on the touch screen interface. In another embodiment, the user interface 110 may include physical buttons or external input devices (e.g., a mouse, a trackpad, and the like).

In one embodiment, a user may use the display 108 to preview images and perform operations to annotate the images, as described herein. The user may interact with the user interface 110 to provide inputs, such as a desired transparency factor, threshold values for selective transparency applications on an annotation image, selecting portions of the annotation image to apply the transparency factor values, and the like, that are described herein.

In one embodiment, the MFD 100 may include a processor 102 and a memory 104. The processor 102 may be communicatively coupled to the memory 104. The memory 104 may be any type of non-transitory computer readable medium, such as a solid state drive, a hard disk drive, a random access memory (RAM), a read-only memory (ROM), and the like. The memory 104 may store instructions that can be executed by the processor 102 to perform the functions that are described herein.

In one embodiment, the memory 104 may store annotating instructions 106. In one embodiment, the annotating instructions 106 may include various functions that are described herein to annotate an image with a desired level of transparency. The annotating instructions 106 may also store functions that are described herein to allow a desired level of transparency to be applied to selective portions of an annotation image, as discussed in further details below.

As discussed above, previous methods may apply full transparency or full opaqueness to annotations. There is no ability to select a desired level of transparency for the annotation image on a canvas image. In addition, the methods were applied to binary image data.

The present disclosure provides functions stored in the annotating instructions 106 that can be applied to a color space associated with the MFD 100. In one example, the color space is a cyan, magenta, yellow, and key (CMYK) color space that has values between 0 and 255. However, it should be noted that the functions described herein can be modified to apply to other color spaces such as red, green, blue (RGB) color spaces, and the like.

Figure 2:
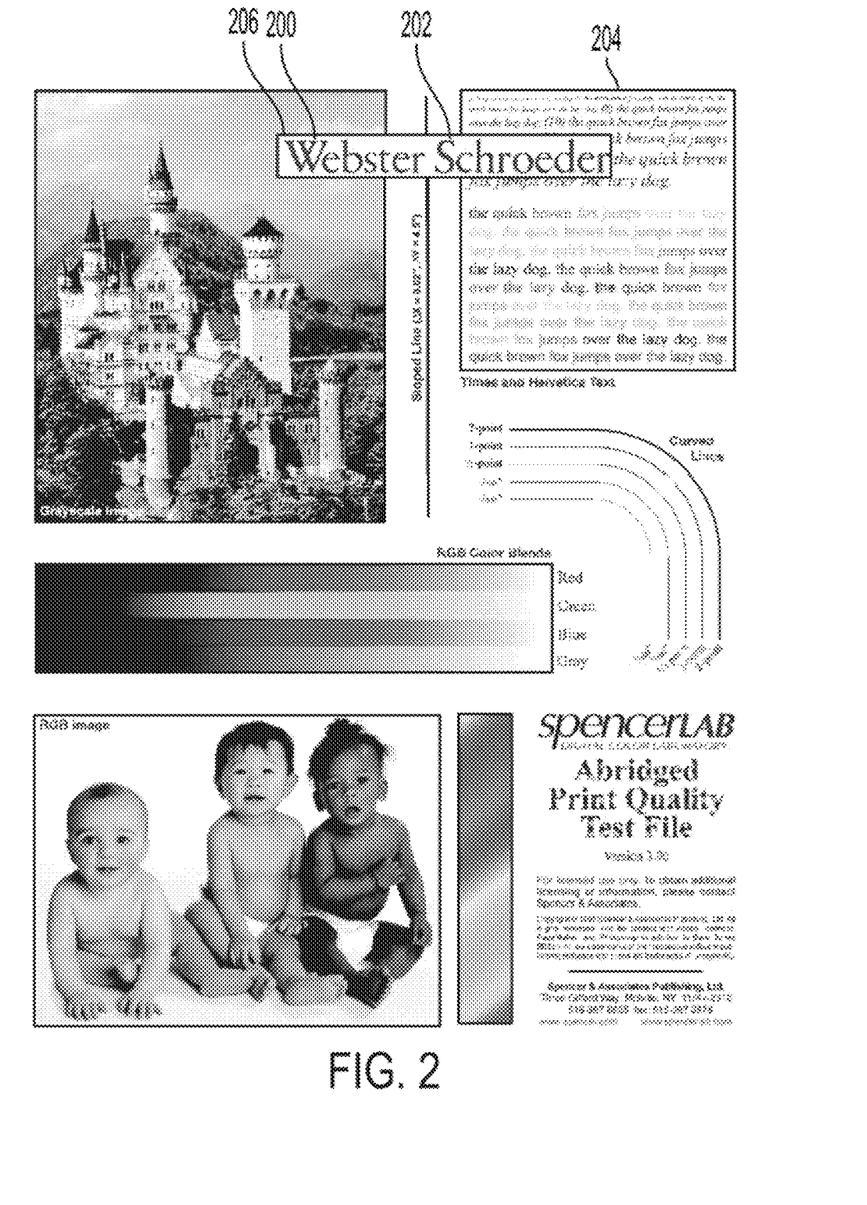
FIG. 2 illustrates an example screenshot of an example annotation of an image in opaque mode of the present disclosure.
Figure 3:
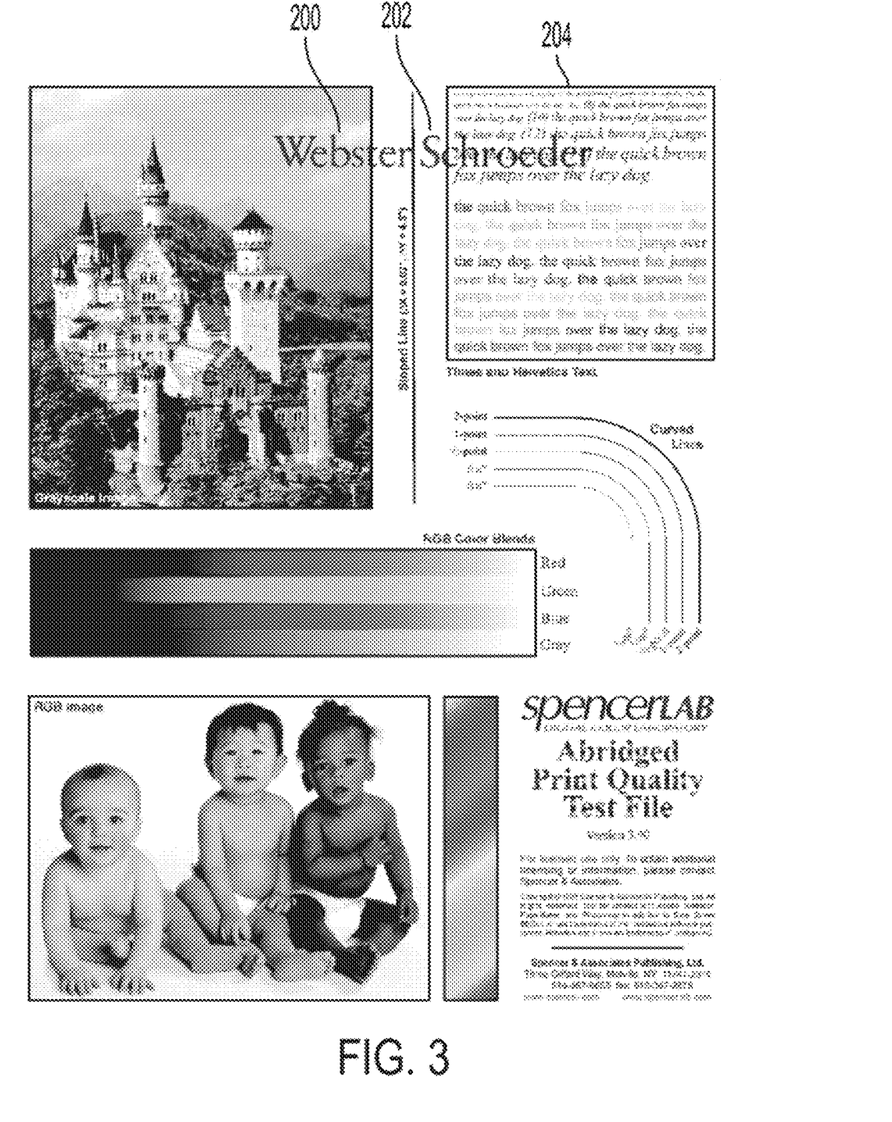
FIG. 3 illustrates an example screenshot of an example annotation of an image in transparent mode of the present disclosure.

FIG. 2 illustrates an example of an annotation image 200 that is added in an opaque mode to a canvas image 204 to generate an example of an annotated canvas image. FIG. 3 illustrates an example of the annotation image 200 that is added in a transparent mode to the canvas image 204 to generate another example of an annotated canvas image. In other words, the annotated canvas image may be a new document or image that is generated based on pixel color values that are applied in a location where a pixel of the annotation image 200 overlaps a pixel of the canvas image 204 and that is also calculated from the pixel color values of the annotation image 200 and the canvas image 204. The pixel color values may be calculated based on an opaque mode, a transparent mode, or a partial transparency mode using the functions described in further details below.

As illustrated in FIG. 2, the annotation image 200 may be an image that contains text or graphics 202. The annotation image 200 may be smaller than the canvas image 204. A user may select the annotation image 200 via the user interface 110 and the display 108 of the MFD 100. In one embodiment, the canvas image 204 and the annotation image 200 may be stored locally on the MFD 100. In another embodiment, the canvas image 204 and the annotation image 200 may be obtained from an external storage device or a remotely located server accessed by the MFD 100 over the Internet.

In an opaque mode, FIG. 2 illustrates how none of the canvas image 204 can be seen where pixels of the annotation image 200 overlap pixels of the canvas image 204. In other words, the annotation image 200 sits on top of the canvas image 204, blocking from view portions of the canvas image 204 that sit below or behind the annotation image 200. Thus, a border 206 may be well defined around the annotation image 200.

In one embodiment, in a CYMK color space of the MFD 100, the opaque mode may be controlled via Function (1) below:

$$\text{Function (1)} - \text{Output}O = \text{Input2},$$

where OutputO is the pixel color value of the combination of the annotation image pixel and the canvas image pixel for an opaque mode, and Input2 is a pixel color value of the annotation image. In other words, in opaque mode, the pixel color values of the annotation image 200 are used for all locations where the annotation image 200 overlaps the canvas image 204.

In a transparent mode, FIG. 3 illustrates how all of the portions of the canvas image 204 that are not blocked by text 202 of the annotation image 200 can be seen through the annotation image 200. In other words, pixels of the canvas image 204 that overlap a pixel of the annotation image 200 may have a pixel color value of the canvas image 204 or a combination of the pixel value of the canvas image 204 and the pixel value of the annotation image 200. Thus, it appears as if the annotation image 200 is transparent, and portions of the canvas image 204 that sit below or behind the annotation image 200 can be seen.

In one embodiment, in the CYMK color space of the MFD 100, the transparent mode may be controlled via Function (2) below:

$$\text{Function (2)} - \text{Output}T = \min(255, \text{Input1} + \text{Input2}),$$

where OutputT is the pixel color value of the combination of the annotation image pixel and the canvas image pixel for a transparent mode, Input1 is a pixel color value of the canvas image pixel, and Input2 is a pixel color value of the annotation image pixel. The OutputT pixel color value is selected as the smaller value of 255 and a combination of Input1 and Input 2. In other words, if the combination of Input1 and Input 2 is less than 255, then the pixel value of the combination of Input1 and Input2 is used as the OutputT pixel value. If the combination of Input1 and Input2 is greater than 255, then 255 is used as the OutputT pixel value.

Figure 4:
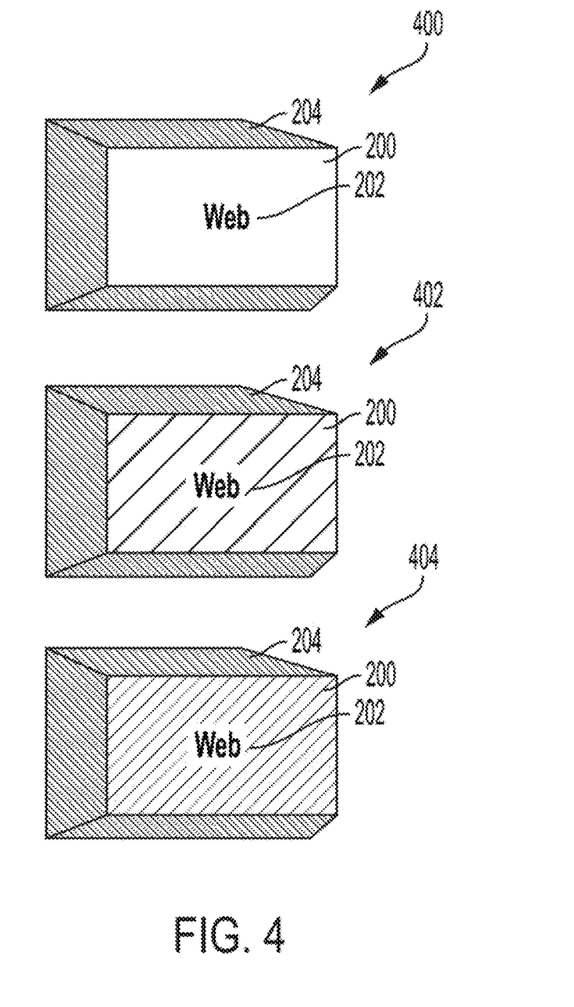
FIG. 4 illustrates an example of various transparency factors of the annotation image of the present disclosure.

In one embodiment, the present disclosure may allow a user to choose a transparency factor to have the annotation image 200 be less than full opaque or to have some transparency. FIG. 4 illustrates an example of various transparency factors of the annotation image 204 of the present disclosure. For example, FIG. 4 illustrates different annotation images 400, 402, and 404. The annotation image 400 illustrates an example where the annotation image 200 is in full opaque mode. In other words, none of the dark shading of the canvas image 204 appears through the annotation image 200. For example, the annotation image 400 may be similar to the opaque mode example, illustrated in FIG. 2, and described above.

The image 402 illustrates an example where a transparency factor of 25%, or 0.25, is applied. Thus, 25% of the shading in the canvas image 204 may appear through the portions of the annotation image 204 that do not contain text 202.

The image 404 illustrates an example where a transparency factor of 75%, or 0.75 is applied. Thus, 75% of the shading in the canvas image 204 may appear through the portions of the annotation image 204 that do not contain text 202.

In one example, a partial transparency may be applied to the annotation image 204 in accordance with Function (3) below:

Function (3)–Output=TransparencyFactor*OutputT+
(1−TransparencyFactor)*OutputO, where Output is a pixel color value of the annotation image, TransparencyFactor is a value between 0 and 1 that is user selected, OutputT is defined in Function (2) above, and OutputO is defined by Function (1) above.

In one embodiment, the TransparencyFactor may be selected via the user interface 110 and the display 108. For example, the user may be prompted to enter a desired value for the TransparencyFactor between 0 and 1, where 1 is full transparency and 0 is full opaqueness (or no transparency). The value may be entered as a decimal value, for example 0.2, 0.25, 0.5, 0.77, 0.90, and the like. The MFD 100 may then compute the output for each pixel where a pixel of the annotation image 200 overlaps a pixel of the canvas image 204. The annotation image (e.g., the image 400, 402, and 404) may then be generated to have a pixel value based on the calculated output of Function (3).

It should be noted that the output pixel color value for all of the functions described herein may be performed for each color of the CYMK color space. So for each pixel, the output pixel color value may include four values that indicate a particular color of a pixel in the final annotated canvas image (e.g., one for each C, Y, M, and K). For grayscale images, the Output may include a single pixel color value between 0 and 255.

In one embodiment, the TransparencyFactor may be applied to select portions of the annotation image 200. In one embodiment, the select portions may be based on pixels with a particular color. For example, a user may want to keep all red in the annotation image 200 unaltered. Thus, any pixels in the annotation image 200 that have a pixel value associated with a red color may be processed in opaque mode with Function (1) and all remaining pixels may be processed in a transparent mode with Function (2) or a partial transparency in accordance with Function (3) described above.

In one embodiment, the color or color ranges that the TransparencyFactor can be applied to may be defined using threshold values or a threshold range. Each pixel color value of the annotation image 200 may be compared to the threshold values to determine how the pixel in the annotation image 200 should be processed. The threshold values may be defined by a user. In another example, the user may select which colors should be processed in opaque mode or left unaltered, and the processor 102 may automatically set the threshold values associated with the colors selected by the user.

For example, the threshold may be single value (e.g., $C>T_c$, $Y>T_y$, $M>T_m$, and $K>T_K$). In another example, the threshold may be a range (e.g., 50<C<120, 100<Y<130, 150<M<200, and 130<K<210). In one example, the threshold may be applied for each color value of the pixel in the CMYK color spaces. Thus, each pixel may be processed based on the pixel color value of each color meeting the single value threshold or falling within the threshold range (e.g., pixel color values that meet the threshold range may be processed via Function (1) in opaque mode, and all other pixels may be processed via Function (2) or Function (3)).

Figure 5:
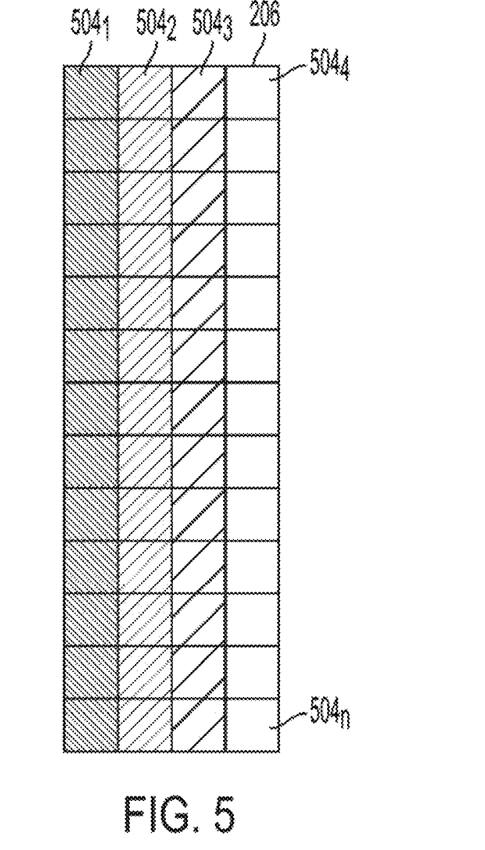
FIG. 5 illustrates an example of gradual transparency of a border of the annotation image of the present disclosure.

In another example, the portion of the annotation image 200 that the TransparencyFactor in accordance with Function (3) may be applied to may be the border 206. FIG. 5 illustrates an example of how the TransparencyFactor may be gradually applied to border pixels $504_1$-$504_n$ (hereinafter individually referred to as a pixel 504 or collectively referred to as pixels 504) to provide a smooth or gradual transition from transparent to opaque. This may allow the insertion of the annotation image 200 to appear "softer" on the canvas image 204.

In one embodiment, the border 206 may be defined as a graphical line or image that is located around the annotation image 200. For example, the annotation image 200 may have a line that is drawn around the text or graphics 202 within the annotation image 200. In another example, the border 206 may be defined as a pre-defined number of pixels along the sides of the annotation image 200. For example, some annotation images 200 may be borderless or have an irregular border.

FIG. 5 illustrates an example of the border 206 that includes pixels $504_1$ to $504_n$. The border 206 may include four pixels from left to right or in each row of pixels. It should be noted that FIG. 5 illustrates only a portion of the border 206 or a single side of the border 206.

An example of the gradual change in transparency of the pixels 504 is illustrated using a row of pixels $504_1$ to $504_4$. In one example, the canvas image 204 below the border 206 may have a dark shading. Thus, FIG. 5 illustrates how pixel $504_1$ may have a TransparencyFactor of 1, the pixel $504_2$ may have a TransparencyFactor of 0.66, the pixel $504_3$ may have a TransparencyFactor of 0.33, and the pixel $504_1$ may have a TransparencyFactor of 0. As a result, the dark shading of the canvas image 204 in the pixels below the pixels $504_1$-$504_4$ of the border 206 may gradually cover the dark shading until none of the dark shading is visible below the annotation image 200.

In one embodiment, the gradual change at the border 206 may be performed in accordance with a BlendingFactor. The BlendingFactor may have a series of values from 1 to 0. The values may be increments based off of a number of pixels identified in the border 206. For example, if the border 206 comprises 10 pixels, then the BlendingFactor may have increments of 0.1 (e.g., 1, 0.9, 0.8, 0.7, and so forth, until 0). The BlendingFactor may be applied in accordance with Function (4) below:

Function (4)–OutputB=BlendingFactor*Input1+(1−
BlendingFactor)*Output, where OutputB is a pixel color value for a border pixel 504, BlendingFactor is a value between 1 and 0, as described above, Input1 is a pixel color value of the canvas image 204 located below a particular border pixel 504, and Output is the pixel color value calculated from Function (3) defined above.

In one embodiment, the Function (4) may be applied to borders that may not be black or white. The Function (4) may be applied when smooth blending is not a concern between the pixels of the canvas image 204 and the border 206 of the annotation image 200.

Figure 6:
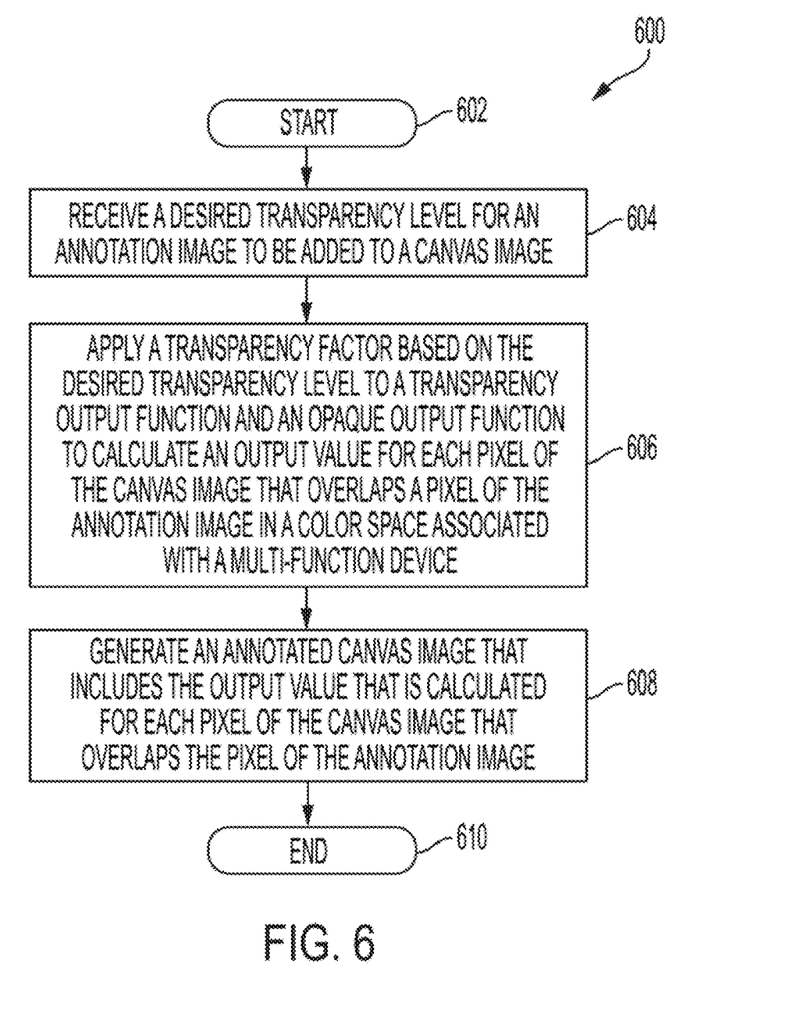
FIG. 6 illustrates a flow chart for a method of annotating an image of the present disclosure.

FIG. 6 illustrates a flow chart of an example method 600 for annotating an image of the present disclosure. In one embodiment, the method 600 may be performed by the MFD 102 or by an apparatus such as the apparatus 700 illustrated in FIG. 7 and discussed below.

In one embodiment, the method 600 begins at block 602. At block 604, the method 600 receives a desired transparency level for an annotation image to be added to a canvas image. For example, a user may select an annotation image from a local storage on the MFD or an external storage device. The annotation image may be selected via a user interface of the MFD. The annotation image may be added to a canvas image that is also selected from a local storage, an external storage, or may be a scanned document.

In one embodiment, the user may want to customize the transparency level of the annotation image on the canvas image. The user may not want to have the annotation image be fully opaque or fully transparent. In one embodiment, the user may want to only apply the desired transparency level to portions of the annotation image. For example, the desired transparency level can be applied to all portions of the annotation image except pixels that have a particular color or may be applied to pixels that have a particular color. In another example, the desired transparency level may be applied to a border of the annotation image to provide a softer transition between the pixels of the canvas image and the pixels around the border of the annotation image.

At block 606, the method 600 applies a transparency factor based on the desired transparency level to a transparency output function and an opaque output function to calculate an output value for each pixel of the canvas image that overlaps a pixel of the annotation image in a color space associated with the MFD. For example, the Function (3) may be applied to calculate the output value for each pixel color value. The transparency factor may be selected to have a value between 0 and 1.

In one embodiment, the pixels may be generated in a CYMK color space. Thus, each pixel color value may have four values, one value each representing a color C, Y, M, and K and have a value between 0 and 255.

In one embodiment, when the desired level of transparency is applied to a portion of the annotation image, thresholds or threshold ranges may be used to define a desired color. The pixel color value defined by the thresholds can be used to selectively apply the transparency factor to desired portions of the annotation image. In one embodiment, the transparency factor can be gradually increased for pixels in the border of the annotation image. In one embodiment, Function (4) defined and discussed above, may be used to gradually apply the transparency factor based on a blending factor to pixels in the border of the annotation image.

At block 608, the method 600 generates an annotated canvas image that includes the output value that is calculated for each pixel of the canvas image that overlaps the pixel of the annotation image. In other words, a new image that includes the calculated output value may be generated and stored as a separate file from the annotation image and the canvas image. At block 610, the method 600 ends.

Figure 7:
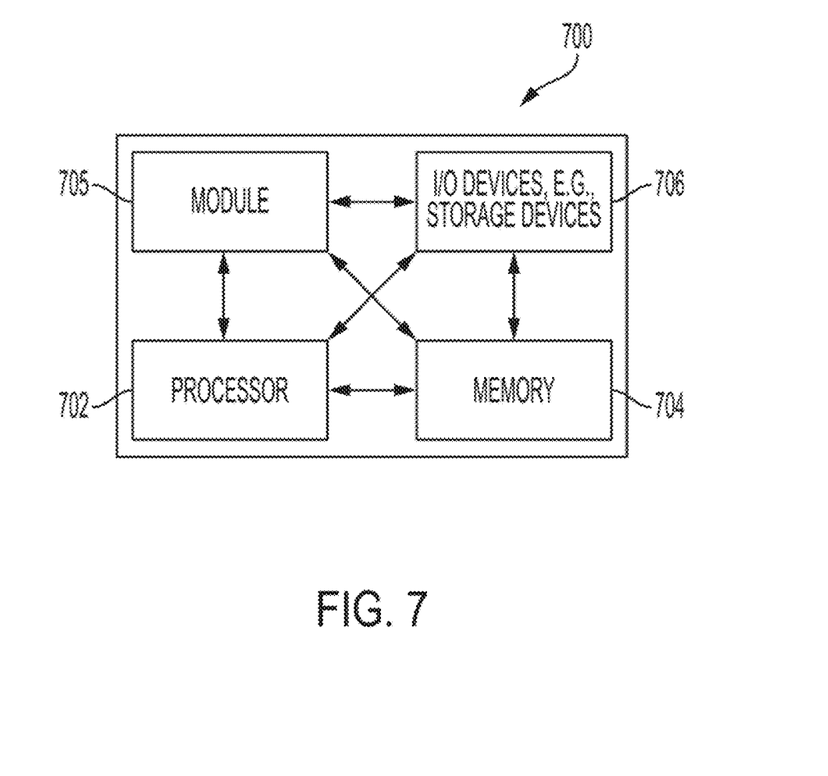
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for annotating an image, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for annotating an image (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for annotating an image (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   receiving, by a processor of a multi-function device (MFD), a desired transparency level for an annotation image to be added to a canvas image;

applying, by the processor, a transparency factor based on the desired transparency level to a transparency output function and an opaque output function to calculate an output value for each pixel of the canvas image that overlaps a pixel of the annotation image in a color space associated with the MFD; and generating, by the processor, an annotated canvas image that includes the output value that is calculated for each pixel of the canvas image that overlaps the pixel of the annotation image.

2. The method of claim 1, wherein the color space comprises a cyan, magenta, yellow, and key (CMYK) color space.

3. The method of claim 2, wherein the transparency output function comprises a smaller value of 255 or a color value of a pixel of the annotation image and a color value of a pixel of the canvas image.

4. The method of claim 2, wherein the opaque output function comprises a color value of a pixel of the annotation image.

5. The method of claim 2, wherein the output value comprises a sum of the transparency factor applied to the a transparency output value of the transparency function and one minus the transparency factor applied to an opaque output value of the opaque function.

6. The method of claim 1, wherein the transparency factor comprises a value between 0 and 1.

7. The method of claim 1, wherein the transparency factor is applied to a portion of the annotation image.

8. The method of claim 7, wherein the portion of the annotation image is based on a color defined by the color space associated with the MFD.

9. The method of claim 8, wherein a threshold range is provided for each color of the color space associated with the MFD to define the color that is to remain opaque.

10. The method of claim 7, wherein the portion comprises a border of the annotation image.

11. The method of claim 1, wherein the transparency factor is gradually increased from 0 to 1 for pixels that are included in the border of the annotation image.

12. A multi-function device (MFD), comprising:
a processor; and
a non-transitory computer-readable medium storing a plurality of instructions, which when executed by the processor, causes the processor to perform operations, comprising:
receiving a desired transparency level for an annotation image to be added to a canvas image;
applying a transparency factor based on the desired transparency level to a transparency output function and an opaque output function to calculate an output value for each pixel of the canvas image that overlaps a pixel of the annotation image in a color space associated with the MFD; and
generating an annotated canvas image that includes the output value that is calculated for each pixel of the canvas image that overlaps the pixel of the annotation image.

13. The MFD of claim 12, wherein the color space comprises a cyan, magenta, yellow, and key (CMYK) color space.

14. The MFD of claim 13, wherein the transparency output function comprises a smaller value of 255 or a color value of a pixel of the annotation image and a color value of a pixel of the canvas image.

15. The MFD of claim 13, wherein the opaque output function comprises a color value of a pixel of the annotation image.

16. The MFD of claim 13, wherein the output value comprises a sum of the transparency factor applied to the a transparency output value of the transparency function and one minus the transparency factor applied to an opaque output value of the opaque function.

17. The MFD of claim 12, wherein the transparency factor comprises a value between 0 and 1.

18. The MFD of claim 12, wherein the transparency factor is applied to a portion of the annotation image.

19. The MFD of claim 18, wherein the portion of the annotation image is based on a color defined by the color space associated with the MFD.

20. A method, comprising:
receiving, by a processor of a multi-function device (MFD), a desired transparency level for an annotation image to be added to a canvas image;
applying, by the processor, a transparency factor based on the desired transparency level to a transparency output function and an opaque output function to calculate an output value for each pixel of the canvas image that overlaps a pixel of the annotation image in a color space associated with the MFD; and
generating, by the processor, an annotated canvas image that includes the output value that is calculated for each pixel of the canvas image that overlaps the pixel of the annotation image.

* * * * *